United States Patent [19]
Saur

[11] Patent Number: 5,676,308
[45] Date of Patent: Oct. 14, 1997

[54] THERMOSTATIC VALVE

[75] Inventor: Roland Saur, Stuttgart, Germany

[73] Assignee: Behr-Thomson-Dehnstoffregler GmbH & Co., Germany

[21] Appl. No.: 574,409

[22] Filed: Dec. 15, 1995

[30] Foreign Application Priority Data

Jan. 20, 1995 [DE] Germany ............ 295 00 897 U

[51] Int. Cl.$^6$ ............................................ F01B 29/10
[52] U.S. Cl. ..................... 236/34.5; 236/68 R; 251/11
[58] Field of Search ............ 236/34, 34.5, 68 R, 236/100; 251/11

[56] References Cited

U.S. PATENT DOCUMENTS

| 4,344,564 | 8/1982 | Magnuson | 236/34.5 |
|---|---|---|---|
| 4,441,652 | 4/1984 | Minami | 236/100 |
| 4,666,081 | 5/1987 | Cook et al. | 236/68 R |
| 4,776,559 | 10/1988 | Fornasari | 236/68 R |
| 4,875,437 | 10/1989 | Cook et al. | |
| 4,890,790 | 1/1990 | Wagner | 236/34.5 |
| 5,385,296 | 1/1995 | Kurz et al. | 236/34.5 |

FOREIGN PATENT DOCUMENTS

| GM 19 50755 | 4/1966 | Germany . |
|---|---|---|
| GM 7142 759 | 11/1971 | Germany . |
| 3018682 A1 | 11/1980 | Germany . |
| 3440504 A1 | 6/1985 | Germany . |
| 86 23 574.5 | 11/1986 | Germany . |
| 86 10 959.6 | 10/1987 | Germany . |
| 3843827 A1 | 7/1990 | Germany . |
| 4230571 A1 | 3/1994 | Germany . |
| 4233913 A1 | 4/1994 | Germany . |
| 4409547 | 1/1995 | Germany . |

*Primary Examiner*—William E. Tapolcai
*Attorney, Agent, or Firm*—Evenson, McKeown, Edwards & Lenahan P.L.L.C.

[57] ABSTRACT

A thermostatic valve has a multi-part valve housing which forms a mixing or distributing chamber which is provided with engine connections for an engine inlet, an engine outlet and a radiator connection. An electrically heatable thermostatic working element is situated in the mixing or distributing chamber, having a housing which is arranged in a stationary manner and to which electric connecting lines are guided from the outside. The thermostatic working element has an extendable working piston which is provided with at least one valve member for adjusting flow cross-sections for flows between the engine inlet, the engine outlet and the radiator connection. The housing of the thermostatic working element is arranged completely in the mixing or distributing chamber. The housing of the thermostatic working element is held on a support of the valve housing which is situated in the mixing or distributing chamber and through which the electric connecting lines are guided to the housing of the working element.

22 Claims, 6 Drawing Sheets

5,676,308

THERMOSTATIC VALVE

BACKGROUND AND SUMMARY OF THE INVENTION

This invention relates to a thermostatic valve having a multi-part valve housing which forms a mixing or distributing chamber which is provided with engine connections for an engine inlet and an engine outlet and with a radiator connection and in which an electrically heatable thermostatic working element is situated whose housing, to which electric connecting lines are guided from the outside, is arranged in a stationary manner and whose extendable working piston is provided with at least one valve member for adjusting flow cross-sections for flows between the engine inlet, the engine outlet and the radiator connection.

The stationary arrangement of the housing of an electrically heated thermostatic working element in the case of a thermostatic valve, as known from German Patent Document DE 42 33 913 A1, has the advantage that the electric connecting lines are not situated in the coolant flow and also must carry out no movements. Furthermore, there is the advantage that the housing of the thermostatic working element maintains its position in an unchanged manner in all operating conditions so that this housing does not influence the flow conditions in the various operating conditions in different manners. In the case of the known construction, the housing of the thermostatic working element is partially situated outside the actual mixing and distributing chamber and is supported in a stationary manner also outside this mixing and distributing chamber. In order to expose the housing to the coolant flowing in a short-circuit flow, a special valve disk is provided for the main valve, which valve disk, in a closed position, is sealed off with respect to the housing of the thermostatic working element and which reaches around the housing by means of a cage-type section and is mounted on the working piston of the thermostatic working element.

It is an object of the invention to provide a thermostatic valve of the initially mentioned type in the case of which the valve disk of the main valve does not have to be sealed off with respect to the housing of the thermostatic working element.

These and other objects have been achieved according to the present invention by arranging the housing of the thermostatic working element completely in the mixing or distributing chamber, the housing being held on a support of the valve housing situated in the mixing or distributing chamber, through which support the electric connecting lines are guided to the housing of the working element.

In the case of a first embodiment of the invention, the working piston is equipped with a slide valve element which is assigned to the radiator connection and to an engine connection. This results in a simple and compact construction.

In another embodiment, a valve seat is provided in the valve housing, to which valve seat a valve disk is assigned which separates the radiator connection from the mixing or distributing chamber and which is mounted on the working piston. In order to obtain a short-circuiting function for this embodiment, it is further provided that the working piston is connected with a slide valve element which is situated inside the mixing or distributing chamber and which is assigned to an engine connection.

In another embodiment, the valve disk is connected with a short-circuit valve disk by a transmitting element reaching around the stationary housing of the working element and its support. The short-circuit valve disk is arranged in the area of the valve housing facing away from the working piston and is assigned to a short circuit valve opening situated between the working element and the short-circuit valve disk.

These and other objects, features and advantages of the present invention will become more readily apparent from the following detailed description when taken in conjunction with the accompanying drawings.

DETAILED DESCRIPTION OF THE DRAWINGS

Figure 1:
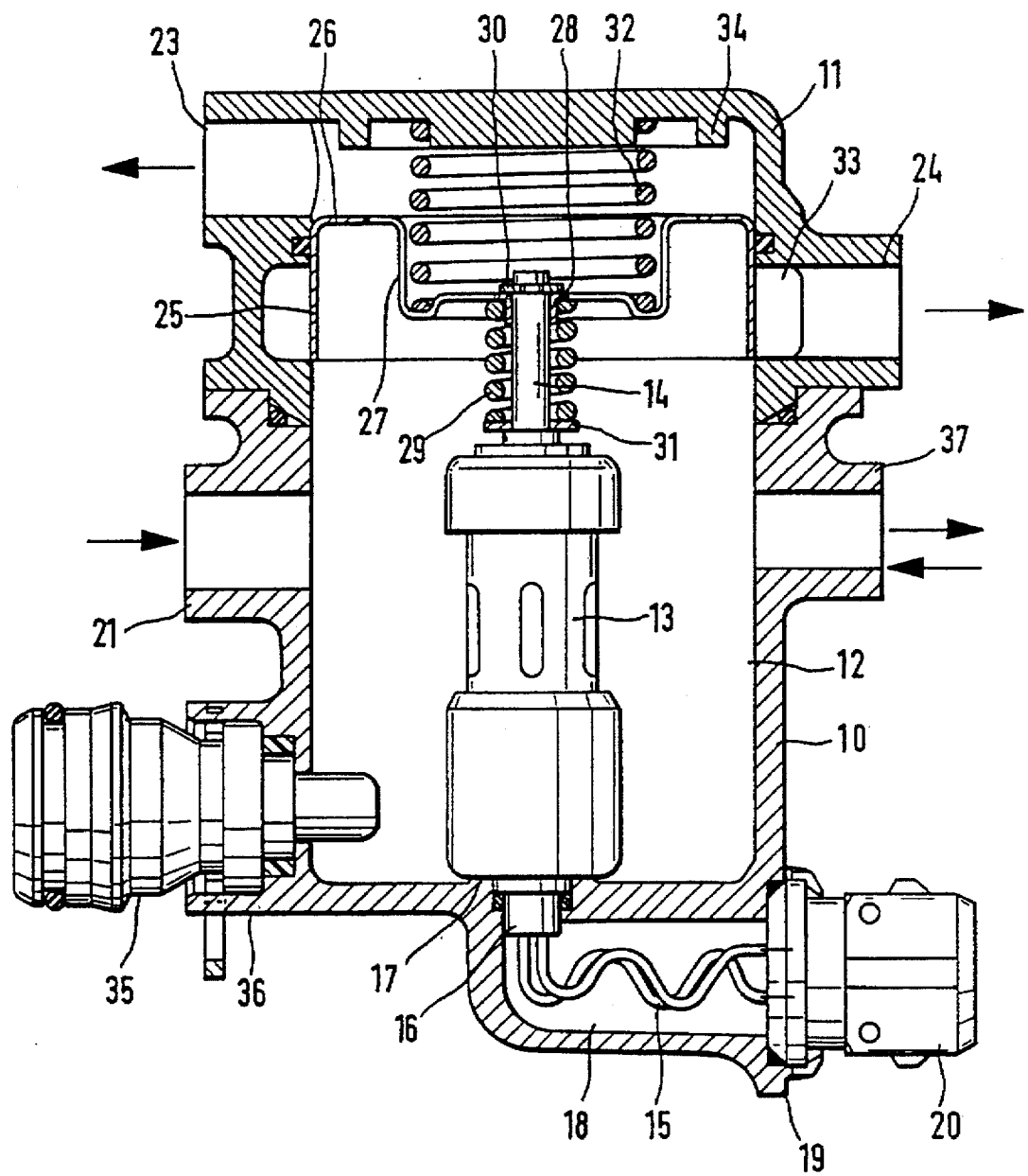
FIG. 1 is an axial sectional view of a thermostatic valve in an arrangement for an engine outlet control, constructed according to a first embodiment of the present invention.

The thermostatic valve illustrated in FIG. 1 has a valve housing which is formed of two parts 10, 11 and which forms a mixing or distributing chamber 12. In the mixing or distributing chamber 12, a thermostatic working element is arranged which has a stationary housing 13 and an extendable working piston 14. The housing 13 contains an expansion medium, particularly a wax mixture, which changes its state of aggregation at a predetermined temperature and, when the temperature is raised further, drives out the working piston 14 essentially in a linear course. The housing 13 contains an electric heating element whose connecting lines 15 are guided through a base 16 closing the bottom of the housing 13. In the illustrated embodiment, the base 16, which is made plastic, caps the lower part of the housing 13. The base 16 is fitted and fixed in a recess of a support 17 formed in the area of the bottom of part 10 of the valve housing. In a modified embodiment, the base 16 does not cap the housing 13 but only projects out of its bottom so that the housing 13 is supported directly on the support 17. The support 17 is adjoined by a molded-on duct 18 in which the connecting lines 15 are situated. This duct 18 leads into a mounting 19 into which a connecting plug 20 is crimped through which the connecting lines 15 can be connected to an electric energy source.

Part 10 of the valve housing is provided with an engine connection 21 which, in the case of this embodiment, is connected to the engine outlet line of a coolant system of an internal-combustion engine.

In the area of part 11, the valve housing is connected with another engine connection 23 which is connected to the engine inlet line. Furthermore, also in the area of part 11, the valve housing is provided with a radiator connection 24 which leads to a coolant radiator.

A slide valve element 25, which is fastened to the working piston 14 of the thermostatic working element, is assigned to the engine inlet connection 23 and the radiator connection 24. The slide valve element 25 has a cylindrical section which is guided in the cylindrical interior of part 11 of the valve housing and which is adjoined by a bent closed ring section 26 which is connected by spaced-apart webs 27 with an interior ring 28 which is arranged on the working piston 14. The interior ring 28 is pressed by a spring 29 against a retaining ring 30 fixed on the working piston 14. In the direction of the housing 13, that is, in the moving-in direction of the working piston 14, the other end of the spring 29 is supported on a ring 31 mounted on the working piston 14. Against the moving-out direction of the working piston 14, the slide valve element 25 is loaded by a closing spring 32 which is supported on part 11 of the valve housing. The closing spring 32 is constructed to be clearly weaker than spring 29.

In FIG. 1, the thermostatic valve is illustrated in the cold condition; that is, in a condition in which the coolant temperature of an internal-combustion engine has not yet reached the opening temperature. The coolant flowing from the engine into the mixing or distributing chamber 12 by way of the engine connection 21 flows through the spaced-apart webs 27 and back to the engine by way of the engine connection 23 leading to the engine inlet because the radiator connection 24 is closed by the slide valve element 25. The slide valve element 25 covers an annular chamber 33 to which the radiator connection 24 is connected. When the coolant heating up during the operation has reached the opening temperature, for example 85° C., the working piston 14 starts its stroke and adjusts the slide valve element 25 such that a flow path is opened up to the radiator connection 24 while the flow cross-section to the engine connection 23 is reduced. In response to the rising coolant temperature, the working piston 14 extends further, in which case the slide valve element 25 opens up the flow cross-section to the radiator connection 24 more and more and closes the flow cross-section to the engine connection 23 more and more until the closed ring 26 of the slide valve element 25 comes to rest against an annular stop 34 so that subsequently the engine connection 23 is closed completely. Should the coolant temperature then rise further and the working piston 14 extend further, it can move against the effect of the spring 29 relative to the slide element 25. If the coolant temperature falls again, the closing spring 32 presses the slide valve element 25 and the working piston 14 back.

By switching on the electric heating element, a control quantity can be superimposed on the temperature-dependent control of the position of the slide valve element 25 because the electric heating will cause the working piston 24 to be extended further than a position corresponding to the coolant temperature. In this way it becomes possible, as required, that is, as a function of operating quantities of the internal-combustion engine and/or environmental influences, to cause a higher cooling performance than required for maintaining the momentary coolant temperature.

As illustrated in FIG. 1, the thermostatic valve has a temperature sensor or a temperature switching apparatus 35 which has a sensor part which projects into the mixing or distributing chamber 12. Part 10 of the valve housing is provided with a corresponding mounting 36 into which the temperature sensor or the temperature switching apparatus 35 is inserted in a sealing manner.

Furthermore, in the area of the mixing or distributing chamber 12, the thermostatic valve 12 is provided with a branch-off connection 37 by way of which the coolant can be branched off which is used, for example, for supplying the heating system of the interior of a vehicle or for preheating oil or for preheating the intake pipe of the internal-combustion engine. In order not to extend the warm-up phase by a branching-off of coolant, that is, the time period which the internal-combustion engine requires in order to reach its operating temperature and the opening temperature of the thermostatic working element, a closure element is assigned to the branch-off connection in a manner which is not shown, which closure element is closed during the warm-up phase. This closure element may operate as a function of the temperature and, for example, not open before the opening temperature of the thermostatic working element is reached. Since, as a rule, the warm-up phase takes place within a defined time period, it is also possible to open up the closure element as a function of the time after the internal-combustion engine is started.

Figure 2:
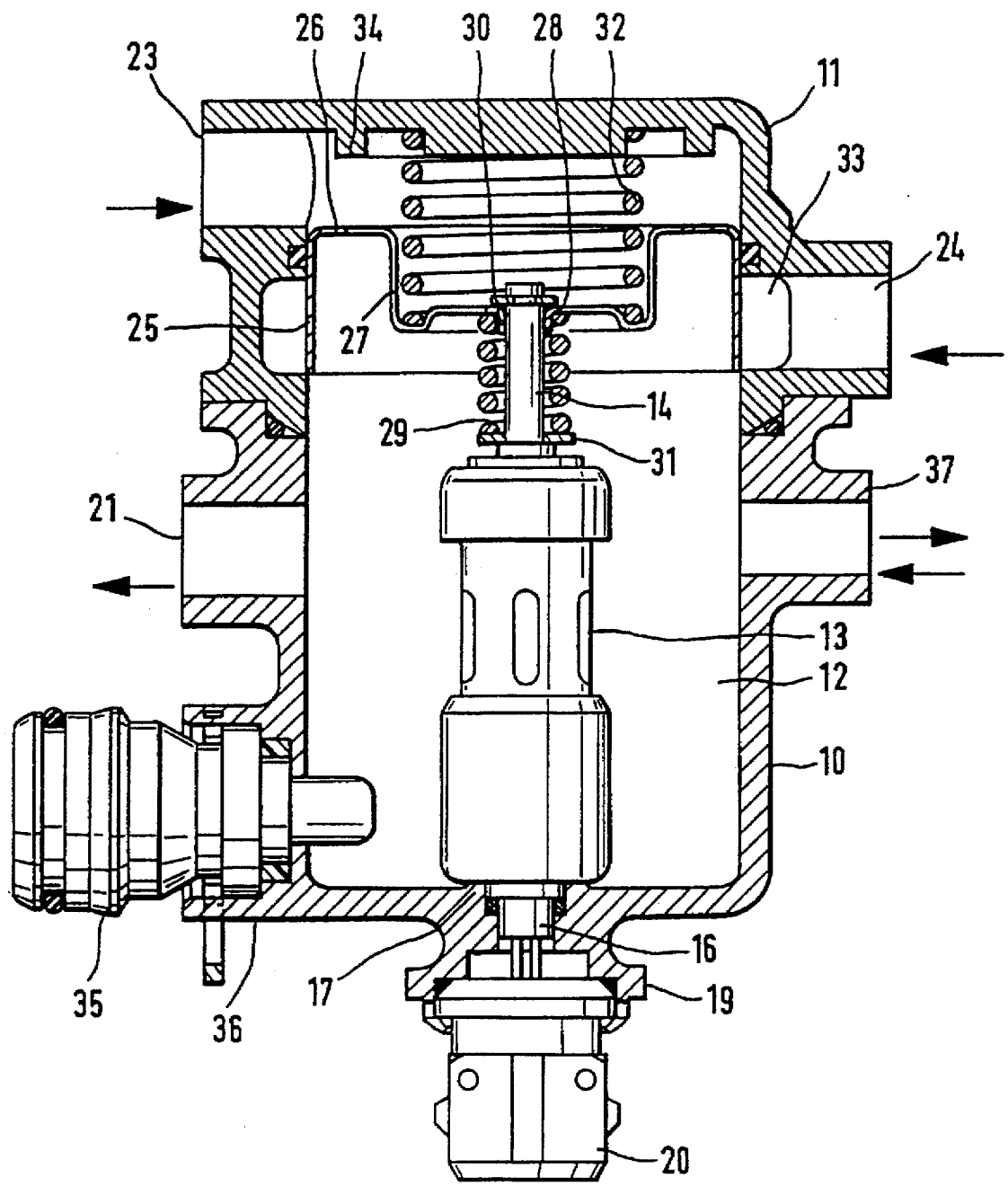
FIG. 2 is an axial sectional view of a thermostatic valve similar to FIG. 1 in an arrangement for an engine inlet control.

The thermostatic valve according to FIG. 1 was explained with respect to its function as an engine outlet control. If the engine connections 21, 23 and the radiator connection 24 are connected correspondingly, it may also be used for an engine inlet control as illustrated in FIG. 2. In its basic construction, the thermostatic valve according to FIG. 2 corresponds to the thermostatic valve according to FIG. 1. A difference exists only with respect to the arrangement of the connecting plug 20 which is arranged in the area of the bottom of part 10 of the valve housing. Otherwise, the construction of the thermostatic valve of FIG. 2 corresponds to the construction of the thermostatic valve according to FIG. 1 so that reference is made to the description concerning FIG. 1. However, the thermostatic valve according to FIG. 2 is inserted into the cooling system in such a manner that an engine inlet control takes place. For this purpose, the engine connection 21 is connected to an engine inlet line; the engine connection 23 is connected to an engine outlet line; and the radiator connection 24 is connected to a radiator outlet line. After the internal-combustion engine is started, the still cold coolant flows from the engine connection 23 by way of the mixing and distributing chamber 12 to the engine inlet connection 21 in a short-circuit flow. After the opening temperature is reached, the working piston 14 will move out and adjust the slide valve element 25 so that cold coolant coming from the coolant radiator by way of the radiator connection 24 flows into the mixing and distributing chamber 12 and flows off from there through the engine connection 21. This mixing operation will change to a pure cooling operation when the slide valve element 25 closes the engine connection 23 completely so that then only cold coolant coming from the coolant radiator flows by way of the mixing and distributing chamber 12 to the engine connection 21 and thus back to the internal-combustion engine.

Figure 3:
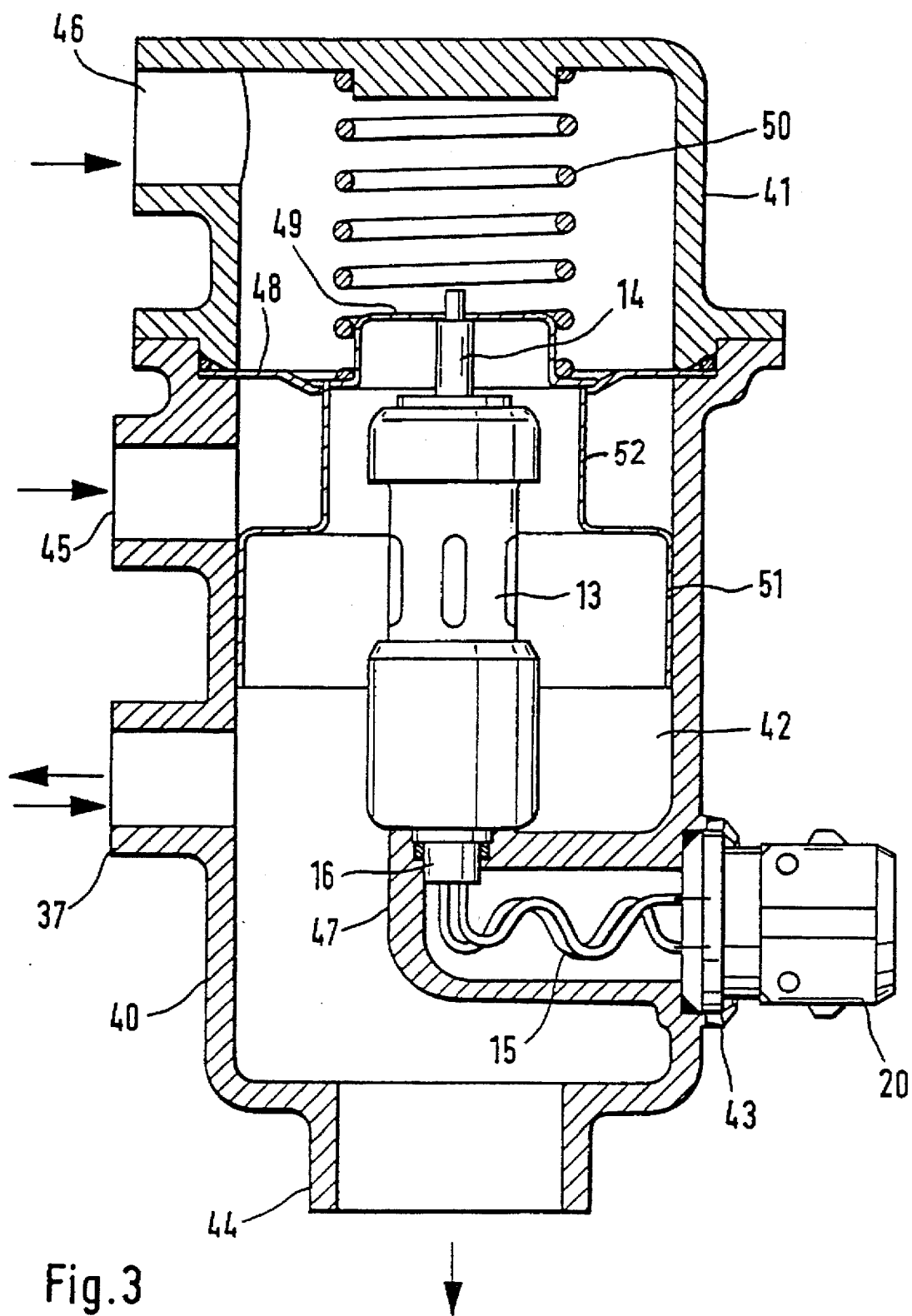
FIG. 3 is an axial sectional view of another embodiment of a thermostatic valve according to the present invention in an arrangement for an engine inlet control.

The thermostatic valve illustrated in FIG. 3 has a valve housing which consists of two parts 40, 41 and which forms a mixing or distributing chamber 42 in which the housing 13 of a thermostatic working element is arranged in a stationary manner. A support 47 projects into the mixing or distributing chamber starting from a lateral wall of part 40 of the valve housing, on which support 47 the housing 13 of the thermostatic working element is supported and fixed by a base 16 which is fitted into a recess of the support 47. In the duct-type support 47, the electric connecting lines 15 for a heating device situated in the interior of the housing 13 of the thermostatic working element extend toward the outside to a connecting plug 20 which is crimped into amounting 43. As a result, the bottom of part 40 of the valve housing is free so that an engine connection 44 can be mounted there. The valve housing is provided with another engine connection 45 and with a radiator connection 46.

A valve seat 48 is arranged between the two parts 40, 41 of the valve housing. In this embodiment, the valve seat 48 consists of a sheet metal ring which is arranged between the two parts 40, 41 of the valve housing. A valve disk 49 is assigned to the valve seat 48, which valve disk 49 is arranged on the working piston 14 of the thermostatic working element. The valve disk 49 is loaded by a closing spring 50 in the retracting direction of the working piston 14, which closing spring 50 is supported on part 41 of the valve housing. The valve formed of the valve seat 48 and the valve disk 49 forms the main valve which separates the radiator connection 46 from the mixing and distributing chamber 42.

By way of, for example, three spaced-apart webs 52, a slide valve element 51 is fastened to the valve disk 49, is assigned to the engine connection 45 and, together with it, forms a short-circuit valve. On part 40 of the valve housing, in the area of the mixing and distributing chamber 42, a branch-off connection 37 is provided which preferably is also provided with a closure element which can be operated as a function of the temperature or the time, and which branch-off connection 37 leads to a heating system of the interior or to a preheating device for oil or to a preheating device for the intake pipe or manifold.

The thermostatic valve illustrated in FIG. 3 is arranged in the cooling system suck that it carries out an engine inlet control. For this purpose, the engine connection 44 is connected to an engine inlet line; the engine connection 45 is connected to an engine outlet line; and the radiator connection 46 is connected to a radiator outlet. After the internal-combustion engine is started, while the coolant is still cold, the valve disk 49 and the slide valve element 51 are in the illustrated position so that the inflow from the radiator connection 46 to the mixing and distributing chamber 42 is blocked and the short-circuit connection between engine connection 45 and engine connection 44 is open. When the opening temperature is reached, the working piston 14 moves out of the stationary housing 13 of the thermostatic working element, in which case, while the temperature continues to rise, the slide valve element 51 shuts off the engine connection 45 more and more, while the valve disk 49 is lifted more an more off the valve seat 48 so that first a mixing operation occurs during which coolant heated by way of engine connection 45 and coolant cooled by way of radiator connection 46 flows to the mixing and distributing chamber 42 and from there flows off by way of the engine connection 44 to the engine. When the slide valve element 51 shuts off the engine connection 45 and instead the main valve formed by the valve seat 48 and the valve disk 49 is opened up completely, a pure cooling operation is obtained. By switching on the electric heating element of the housing 13 of the thermostatic working element, it is possible, when a higher cooling output is required, to move out the working piston 14 beyond its position determined by the temperature of the coolant so that the control range of the thermostatic valve is displaced in the direction of a stronger cooling operation and thus to an increased cooling performance.

The thermostatic valve according to FIG. 3 can also be used for an engine outlet control. For this purpose, engine connection 44 will be connected to the engine outlet; engine connection 45 will be connected to the engine inlet; and the radiator connection 46 will be connected to the radiator inlet.

Figure 4:
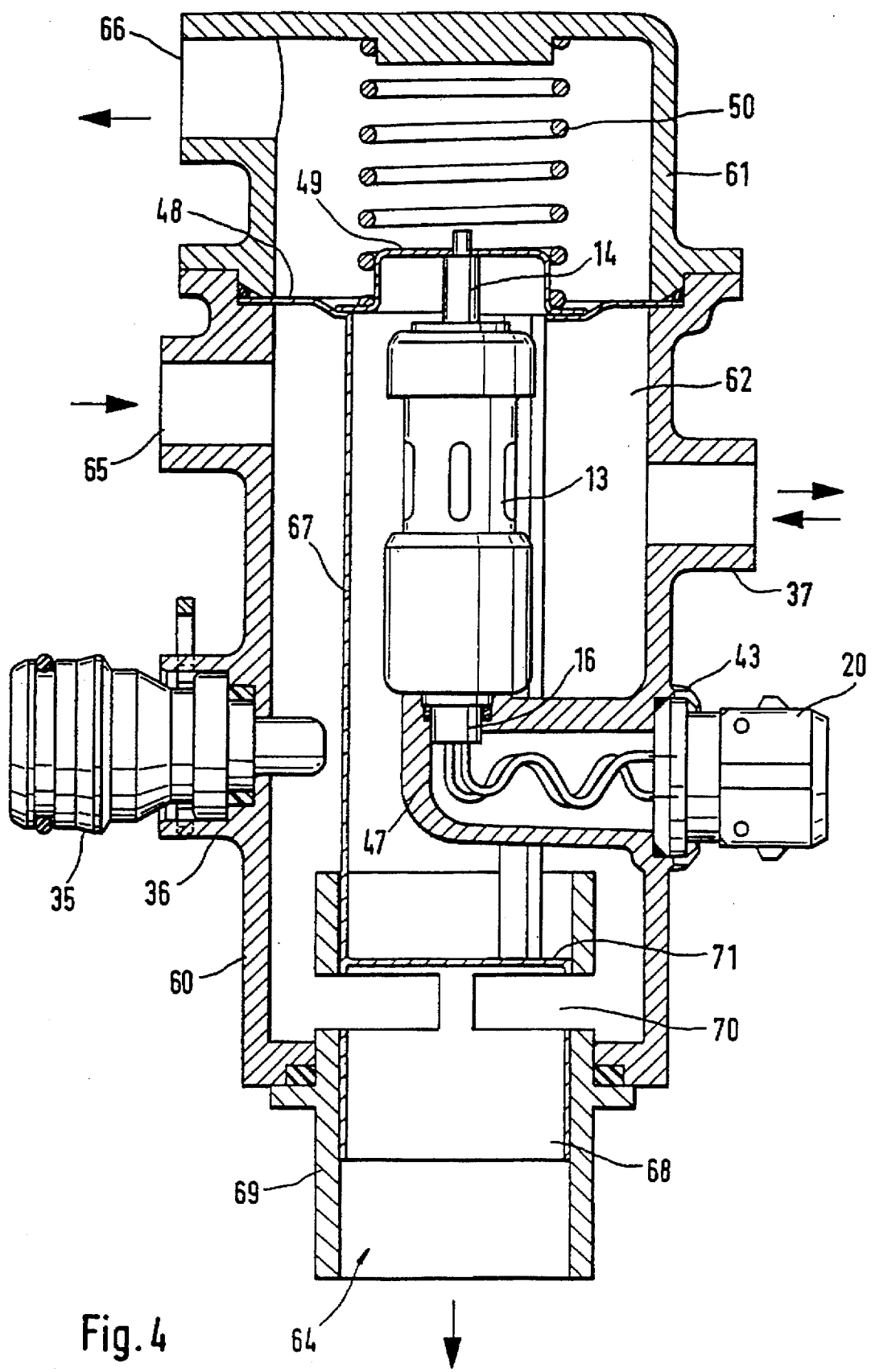
FIG. 4 is an axial sectional view of a thermostatic valve similar to FIG. 3 in an arrangement for an engine outlet control.

Despite its slightly different construction, the embodiment according to FIG. 4 corresponds with respect to its function to the embodiment according to FIG. 3. In a valve housing formed of two parts 60, 61, a mixing or distributing chamber 62 is provided in which the housing 13 corresponding to the embodiment according to FIG. 3 is arranged and fixed in a stationary manner on a support 47. In this embodiment, the support 47 also projects from a lateral wall of part 60 of the housing toward the inside into the mixing or distributing chamber 62 so that its bottom is free for providing an engine connection 64 there. Another engine connection 65 also leads into the mixing or distributing chamber 62. Part 61 of the valve housing is provided with a radiator connection 66 whose area is separated from the mixing or distributing chamber 62 by a main valve formed of a valve seat 48 and a valve disk 49. The valve disk 49 is arranged on the working piston 14 of the thermostatic working element and is loaded by a closing spring 50 which is supported on part 61 of the valve housing.

A short-circuit valve element 68, which is assigned to the engine connection 64, is mounted on the valve disk 49 with a transmitting member 67 which may, for example, consist of three struts. The engine connection 64 is formed by a tube-shaped insert 69 which is fitted from the outside into part 60 of the valve housing and is fastened thereto. The insert 69 has a slot-shaped short-circuit opening 70 to which a slot-shaped opening of the slide valve element 68 corresponds. Above this slot-shaped opening, the slide valve element 68, which is guided in the tube-shaped insert 69, is closed off by a cover plate 71.

Part 60 of the valve housing is provided with a receiving device 36 for a temperature sensor or temperature switch 35 projecting into the mixing or distributing chamber 62. In addition, a branch-off connection 37 for a heating device or the like is provided in the area of the mixing or distributing chamber 62.

The thermostatic valve illustrated in FIG. 4 is connected to the cooling system of an internal-combustion engine such that it operates as an engine outlet control. Engine connection 64 is connected to an engine inlet; engine connection 65 is connected to an engine outlet; and the radiator connection 66 is connected to a radiator inlet. At the time the internal-combustion engine is started and therefore while the coolant is cold, the thermostatic valve is in the position illustrated in FIG. 4. When the opening temperature of the thermostatic working element is reached, the working piston 14 moves out and, while the temperature continues to rise, lifts the valve disk 49 off the valve seat 48 while the slot-shaped short-circuit valve opening 70 is closed off by the slide valve element 68.

The thermostatic valve according to FIG. 4 may also be used as an engine inlet control in which engine connection 64 is connected to an engine outlet; engine connection 65 connected to an engine inlet; and the radiator connection 66 is connected to the radiator outlet.

Figure 5:
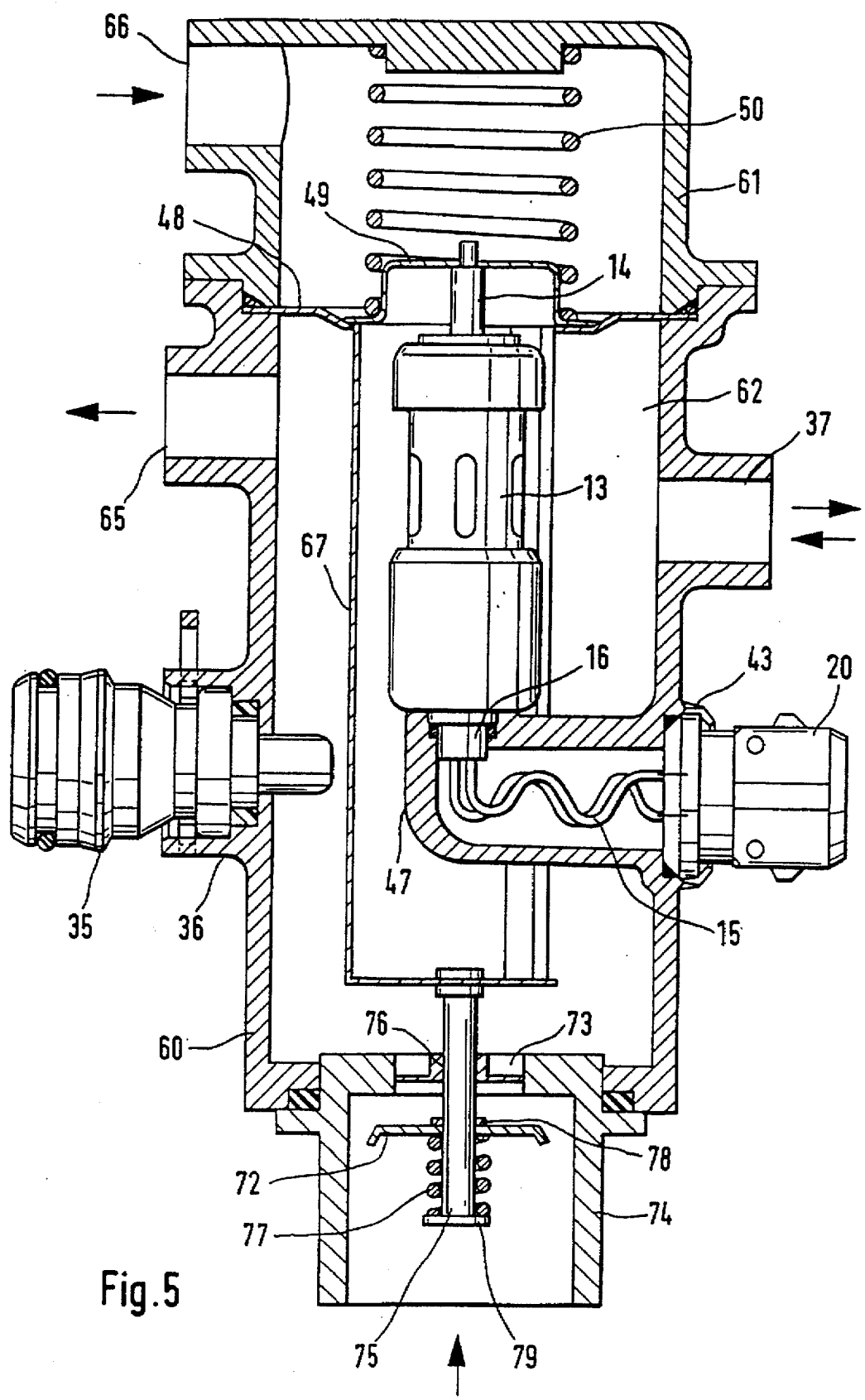
FIG. 5 is an axial sectional view of a thermostatic valve according to the present invention with a main valve disk and a short-circuit valve disk in an arrangement for an engine inlet control.

In its basic construction, the thermostatic valve according to FIG. 5 corresponds to the embodiment according to FIG. 4. However, a short-circuit valve disk 72 is used as the short-circuit valve and is assigned to a short-circuit valve opening 73 which is part of an insert 74 fastened to the lower end of part 60 of the valve housing. The short-circuit valve disk 72 is guided on a pin 75 which is connected with the valve disk 49 of the main valve by a transmitting member 67 consisting, for example, of three struts. The transmitting member 67 is constructed in the same manner as the transmitting member of the embodiment according to FIG. 4 in that it extends around the housing 13 of the thermostatic working element as well as the support 47. The pin 75 is guided in a guide 76 of the insert 74. The valve disk 72 is pressed by a short-circuit spring 76 against a ring 78 mounted on the pin 75, the other end of the spring 76 being supported on the free head 79 of the pin 75.

The thermostatic valve according to FIG. 5 is arranged such that it operates as an engine inlet opening. For this purpose, the insert 74 serving as the engine connection is connected to an engine outlet; the engine connection 65 is connected to an engine inlet; and the radiator connection 66 is connected to a radiator outlet. When the cold engine is started, the thermostatic valve according to FIG. 5 is in the illustrated position in which the main valve formed by the valve disk 49 and the valve seat 48 closes off the radiator connection 66 with respect to the mixing or distributing chamber 62, while the short-circuit valve formed by the short-circuit valve disk 72 and the short-circuit opening 73 is open. When the opening temperature is exceeded, the working piston 14 moves out of the housing 13 of the thermostatic working element, the valve disk 49 being lifted off the valve seat 48, while the short-circuit valve disk 72 is applied to the short-circuit opening 73. When the short-circuit valve disk 72 is placed against the short-circuit opening 73, the short-circuit valve is closed so that only cold coolant coming from the coolant radiator will still flow to the engine connection 65 and thus to the internal-combustion engine. When the valve disk 49 is opened further by the further moving-out of the working piston 14, the short-circuit valve disk 72 is displaced against the effect of the spring 77 on the pin 75. Also in the case of this thermostatic valve, by means of the switching-on of the electric heater of the housing 13, the control range can be shifted to a lower temperature level; that is, independently of the momentary temperature of the coolant, an increased cooling output can be provided.

The thermostatic valve according to FIG. 5 can also be connected to the cooling system in such a manner that it operates as an engine outlet control. For this purpose, the engine connection 65 is connected to the engine outlet; the engine connection formed by the insert 74 is connected to the engine inlet; and the radiator connection 66 is connected to the radiator inlet.

In the case of the embodiments according to FIG. 4 and 5, one engine connection respectively is formed by an insert 69, 74 which projects out of the valve housing. This insert may be designed, for example, as a hose connecting point so that a cooling water hose can be connected here.

Figure 6:
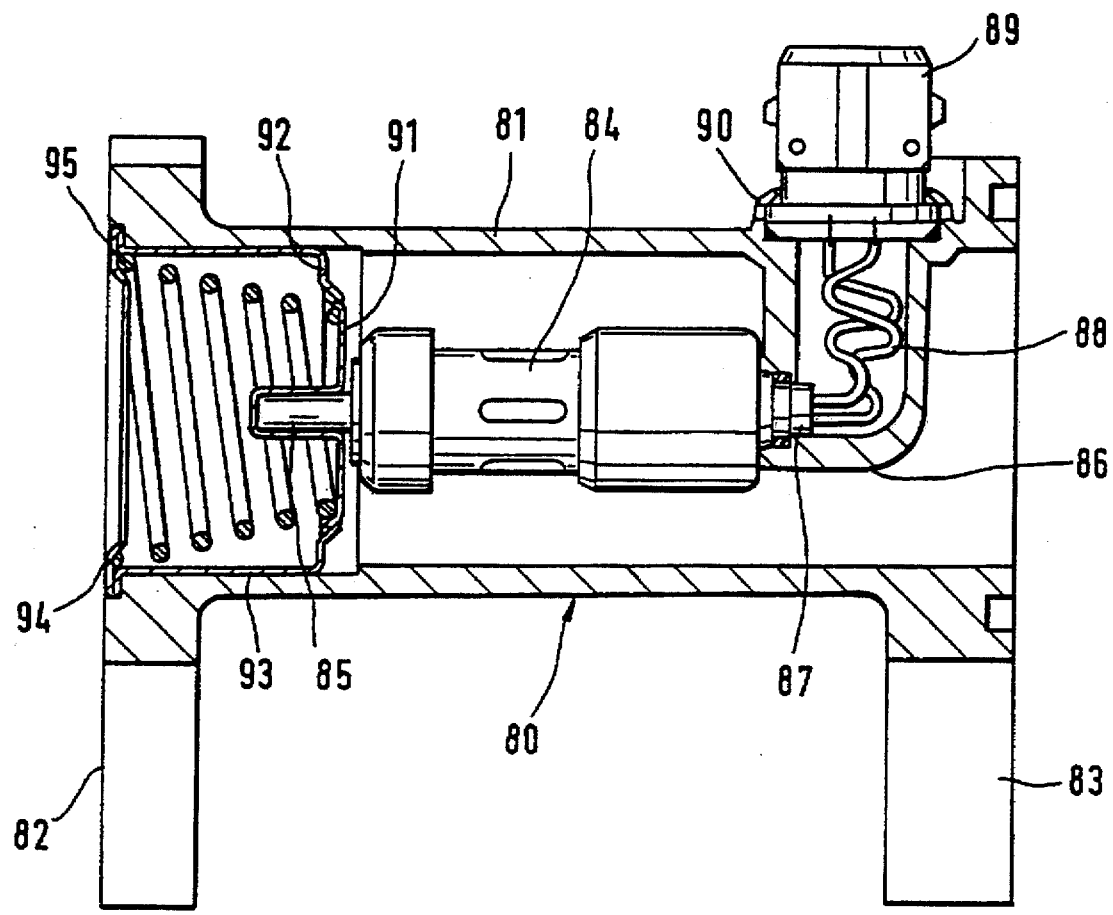
FIG. 6 is an axial sectional view of a closure element which can be connected in front of or behind an engine connection or is assigned to a branch-off connection to an auxiliary device.

The closure element 80 illustrated in FIG. 6 has a pipe connection piece 81 which is provided with fastening flanges 82, 83 on both ends. Inside the pipe connection piece, a thermostatic working element is arranged which has a housing 84 filled with an expansion medium and a working piston 85 which can be extended as a function of the temperature. The housing 84 of the thermostatic working element is held in a stationary manner on a support 86 which is molded to the pipe connection piece 81 and projects into its interior. A base 87 of the housing 84 of the thermostatic working element is inserted in a sealing manner into a receiving device of the support 86 which is constructed in the manner of a duct and is open toward the outside. In this embodiment, the base 87 partially covers the housing 84. In a modified embodiment, the base 87 is limited to a projection protruding from the housing 84 so that the housing 84 is supported by its bottom on the support 86.

An electric heating device is assigned to the housing 84 of the thermostatic working element and is preferably arranged inside the housing 84 and thus inside the expansion medium and can be supplied with electric energy by way of connecting lines 88. The connecting lines 88 are guided in the duct-type support 86 to the outside to a connecting plug 89 which is fastened on the pipe connection piece 81 with a crimped connection 90. The working piston 85 which can be moved in and out coaxially to the connection pipe piece 81 carries a valve disk 91 to which a valve seat 92 is assigned. The valve seat 92 is a component of an insert 93 which is inserted into the pipe connection piece 81 and which forms a supporting ring 94 for a closing spring 95 acting upon the valve disk 91.

The housing 84 of the thermostatic working element preferably contains a wax mixture as the expansion medium which is selected such that it changes its state of aggregation at predetermined temperature and, when the temperature is increased further, moves out in an essentially linear movement.

As mentioned above in the first embodiment, the closure element 80 is assigned to the branch-off connection 37. In order to keep the warm-up phase of the engine as short as possible, the closure element 80 will not open up the forward flow or the return flow to a heating device for the vehicle interior, to a preheating device for oil or to a preheating device for the intake pipe until a defined temperature has been reached. In this case, the closure element 80 operates as a function of the temperature and/or of the time. For example, after a defined time period after the internal-combustion engine is started, in which, as expected, the operating temperature of, for example, 90°, has been reached, the electric heating element of the housing 84 of the thermostatic working element is switched on. The valve formed of the valve disk 91 and the valve seat 92 will then open up so that the flow is released. The heating element can then be switched off because the temperature of the coolant will then be in a range in which the thermostatic working element 84, 85 holds the valve open. It is also possible to operate the closure element 80 only as a function of the temperature; that is, to do without the electric heating device. In this case, the valve disk 91 and/or the valve seat 92 have small openings which permit a flow of a limited flow quantity. In this case, heated coolant reaches the housing 84 of the thermostatic working element and the valve opens to release the flow when the preselected operating temperature is reached.

In another embodiment, the closure element is assigned to one of the engine connections in order to, on the whole, reduce the warm-up phase of the internal-combustion engine. In this case, the valve disk 91 and/or the valve seat 92 have openings which permit a limited coolant flow. The closure element 80 therefore limits the short-circuit flow when the internal-combustion engine is cold. It is, for example, designed such that it opens up toward the end of the warm-up phase, for example at 75° C. or 80° C. The design is such that the closure element does not participate in the control function of the thermostatic valve but has already completely opened up below the temperatures of the control range.

Also in the case of this application, the closure element 80 may be opened up as a function of the temperature and/or of the time. When an electric heating device is not used, the closure element 80 will operate only as a function of the temperature because of leakage flows. However, by using the electric heating element, it is also possible to operate the closure element as a function of time. In this case, after a given time period after the cold internal-combustion engine is started, in which, as expected, the desired opening temperature is reached, the heating element will switch on. The valve 91, 92 will then open up so that the full flow cross-section is unblocked. Since the preheated coolant will then flow around the housing 84 of the working element, the heating element can be switched off again and the closure element 80 will not close again.

The functions, which are the same in principle, can also be implemented when the closure element is constructed as a switching valve, particularly as a magnetic valve. This magnetic valve may be designed to operate as function of the time and/or as a function of a temperature of the coolant sensed by a temperature sensor. In this case, the magnetic valve is open in the non-energized state so that, after the cold internal-combustion engine is started, the magnetic valve is energized for a given time period and/or until a defined temperature is reached and is then closed. However, the use of the thermostatic working element 84, 85 has the advantage that the closure element 80 will also be operable when, for example, a disturbance exists in the current supply.

Since, in principle, it is advantageous in the case of any coolant temperature control by means of a thermostatic valve to shorten the warm-up phase of the internal-combustion engine, the closure element may advantageously also be used in the case of other constructions of thermostatic valves by assigning it to an engine connection and thus, in each case, depending on the flow direction, connecting it in front of or behind the engine connection. Advantageously, this closure element 80 can be used in combination with any thermostatic valve in which a control function which depends on environmental and/or operating parameters is superimposed on the normal control function.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed is:

1. A thermostatic valve comprising:
   a multi-part valve housing which forms a distributing chamber which is provided with engine connections for an engine inlet and an engine outlet and with a radiator connection, and
   an electrically heatable thermostatic working element situated in said valve housing and having a working element housing, to which electric connecting lines are guided from the outside, said working element housing being arranged in a stationary manner, said working element having an extendable working piston and having at least one valve member for adjusting flow cross-sections for flows between the engine inlet, the engine outlet and the radiator connection,
   wherein the working element housing is arranged completely in the distributing chamber and is held on a support of the valve housing which is situated in the distributing chamber the electric connecting lines being guided to the working element housing through the support on which the working element housing is held.

2. A thermostatic valve according to claim 1, wherein the working piston is provided with a slide valve element which is assigned to the radiator connection and to an engine connection.

3. A thermostatic valve according to claim 2, wherein the radiator connection and the engine connection are arranged in a cylindrical section of a part of the valve housing in which the slide valve element is guided.

4. A thermostatic valve according to claim 1, wherein a valve seat is provided in the valve housing to which valve seat a valve disk is assigned which separates the radiator connection from the distributing chamber and which is mounted on the working piston.

5. A thermostatic valve according to claim 4, wherein the working piston is connected with a slide valve element situated inside the distributing chamber which slide valve element is assigned to an engine connection.

6. A thermostatic valve according to claim 5, wherein the engine connection is assigned to a lateral wall of a cylindrical area of a part of the valve housing.

7. A thermostatic valve according to claim 5, wherein the engine connection is formed by a connection pipe piece which is mounted on a part of the valve housing and which is arranged coaxially with respect to the working element and to which the slide valve element is assigned.

8. A thermostatic valve according to claim 7, wherein the connection pipe piece is constructed as a separate piece from the valve housing and projects from the valve housing toward the outside.

9. A thermostatic valve according to claim 4, wherein the valve disk is connected with a short-circuit valve disk by means of a transmitting member which extends around the stationary working element housing and the support, said short-circuit disk being arranged in the area of a part of the valve housing facing away from the working piston and being assigned to a short-circuit valve opening situated between the working element and the short-circuit valve disk.

10. A thermostatic valve according to claim 9, wherein the short-circuit valve opening is part of an additional part mounted on the valve housing.

11. A thermostatic valve according to claim 10, wherein the additional part forms a guide for a pin connected to the transmitting member, on which pin the short-circuit valve disk is arranged.

12. A thermostatic valve according to claim 1, wherein a projection is provided as the support for the working element housing, said projection protruding from a lateral wall of a part of the valve housing and into the distributing chamber.

13. A thermostatic valve according to claim 1, wherein a bottom of a part of the valve housing forms the support.

14. A thermostatic valve according to claim 12, wherein the working element housing is fixed transversely to a direction of movement of the working piston in the support.

15. A thermostatic valve according to claim 13, wherein the working element housing is fixed transversely to a direction of movement of the working piston in the support.

16. A thermostatic valve according to claim 14, wherein the working element housing is provided with a base which is fitted into a recess of the support.

17. A thermostatic valve according to claim 15, wherein the working element housing is provided with a base which is fitted into a recess of the support.

18. A thermostatic valve according to claim 1, wherein a part of the valve housing is provided in the area of the distributing chamber with a connection for a measuring or switching apparatus.

19. A thermostatic valve according to claim 1, wherein a part of the valve housing is provided in the area of the distributing chamber with at least one branch-off connection.

20. A thermostatic valve according to claim 19, wherein the at least one branch-off connection is provided with a closure element which can be activated as a function of temperature.

21. A thermostatic valve according to claim 19, wherein the at least one branch-off connection is provided with a closure element which opens up as a function of time.

22. A thermostatic valve according to claim 1, wherein a closure element, which opens up as a function of at least one of time and temperature, is connected in front of or behind at least one of said engine connections.

* * * * *